(12) United States Patent
Ishigaki et al.

(10) Patent No.: US 11,059,328 B2
(45) Date of Patent: Jul. 13, 2021

(54) TIRE

(71) Applicant: SUMITOMO RUBBER INDUSTRIES, LTD., Hyogo (JP)

(72) Inventors: Yuichi Ishigaki, Hyogo (JP); Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 236 days.

(21) Appl. No.: 16/209,565

(22) Filed: Dec. 4, 2018

(65) Prior Publication Data

US 2019/0184754 A1 Jun. 20, 2019

(30) Foreign Application Priority Data

Dec. 20, 2017 (JP) .............................. JP2017-244325

(51) Int. Cl.
*B60C 11/13* (2006.01)
*B60C 11/03* (2006.01)

(52) U.S. Cl.
CPC ... *B60C 11/0309* (2013.01); *B60C 2011/1338* (2013.01); *B60C 2011/1361* (2013.01)

(58) Field of Classification Search
CPC ............. B60C 11/1353; B60C 11/1307; B60C 11/133; B60C 11/1361; B60C 11/1369; B60C 11/13; B60C 2011/1338; B60C 2011/1361
See application file for complete search history.

(56) References Cited

U.S. PATENT DOCUMENTS

| 6,415,835 B1 * | 7/2002 | Heinen | B60C 11/0309 152/209.21 |
|---|---|---|---|
| 2005/0072505 A1 * | 4/2005 | Takahashi | B60C 11/13 152/209.15 |
| 2005/0126670 A1 * | 6/2005 | Godefroid | B60C 11/0316 152/209.22 |
| 2006/0090828 A1 * | 5/2006 | Yamane | B60C 11/13 152/209.18 |

(Continued)

FOREIGN PATENT DOCUMENTS

| JP | 03086605 A * | 4/1991 | ............ B60C 11/13 |
|---|---|---|---|
| JP | 2004-284499 A | 10/2004 | |

(Continued)

OTHER PUBLICATIONS

Machine Translation: JP-03086605-A,Yamaguchi, Yutaka, (Year: 2020).*

(Continued)

*Primary Examiner* — Kendra Ly
(74) *Attorney, Agent, or Firm* — Greenblum & Bernstein, P.L.C.

(57) ABSTRACT

A tire comprises a tread portion provided with at least one longitudinal groove extending in a tire circumferential direction. The longitudinal groove has a groove bottom surface and a pair of groove wall surfaces extending outwardly in a tire radial direction from the groove bottom surface. The groove bottom surface is provided with a groove bottom protruding portion protruding outwardly in the tire radial direction. At least one of the pair of the groove wall surfaces is provided with a groove wall protruding portion protruding toward a side of a groove center of the longitudinal groove.

15 Claims, 6 Drawing Sheets

(56) References Cited

U.S. PATENT DOCUMENTS

| | | | | |
|---|---|---|---|---|
| 2007/0062626 A1* | 3/2007 | Oyama | ................... | B60C 11/13 |
| | | | | 152/209.19 |
| 2013/0333818 A1* | 12/2013 | Yamaguchi | ........... | B60C 11/042 |
| | | | | 152/523 |
| 2016/0059639 A1* | 3/2016 | Yano | ..................... | B60C 11/042 |
| | | | | 152/209.18 |
| 2017/0028790 A1* | 2/2017 | Shmagranoff | ...... | B60C 11/0306 |

FOREIGN PATENT DOCUMENTS

| | | | | | |
|---|---|---|---|---|---|
| JP | 2005231600 | A | * | 9/2005 | |
| JP | 2007030547 | A | * | 2/2007 | |
| JP | 2013169887 | A | * | 9/2013 | |
| JP | 2016052812 | A | * | 4/2016 | |
| KR | 20020003022 | A | * | 1/2002 | |
| WO | WO-9518022 | A1 | * | 7/1995 | ......... B60C 11/0309 |

OTHER PUBLICATIONS

Machine Translation: JP-2007030547-A, Momozu, Masatoshi, (Year: 2020).*

Machine Translation: JP-2005231600-A; Hashimoto, Yoshimasa; (Year: 2021).*

Machine Translation: JP-2013169887-A; Okubo Yumiko; (Year: 2021).*

Machine Translation: JP-2016052812-A; Endo Toyoaki; (Year: 2021).*

Machine Translation: KR-20020003022-A; Lim Seong Su; (Year: 2021).*

U.S. Appl. No. 16/241,567 to Yuichi Ishigaki et al., filed Jan. 7, 2019.

U.S. Appl. No. 16/241,590 to Koichi Nakajima, filed Jan. 7, 2019.

U.S. Appl. No. 16/242,703 to Koichi Nakajima, filed Jan. 8, 2019.

U.S. Appl. No. 16/246,026 to Koichi Nakajima, filed Jan. 11, 2019.

* cited by examiner

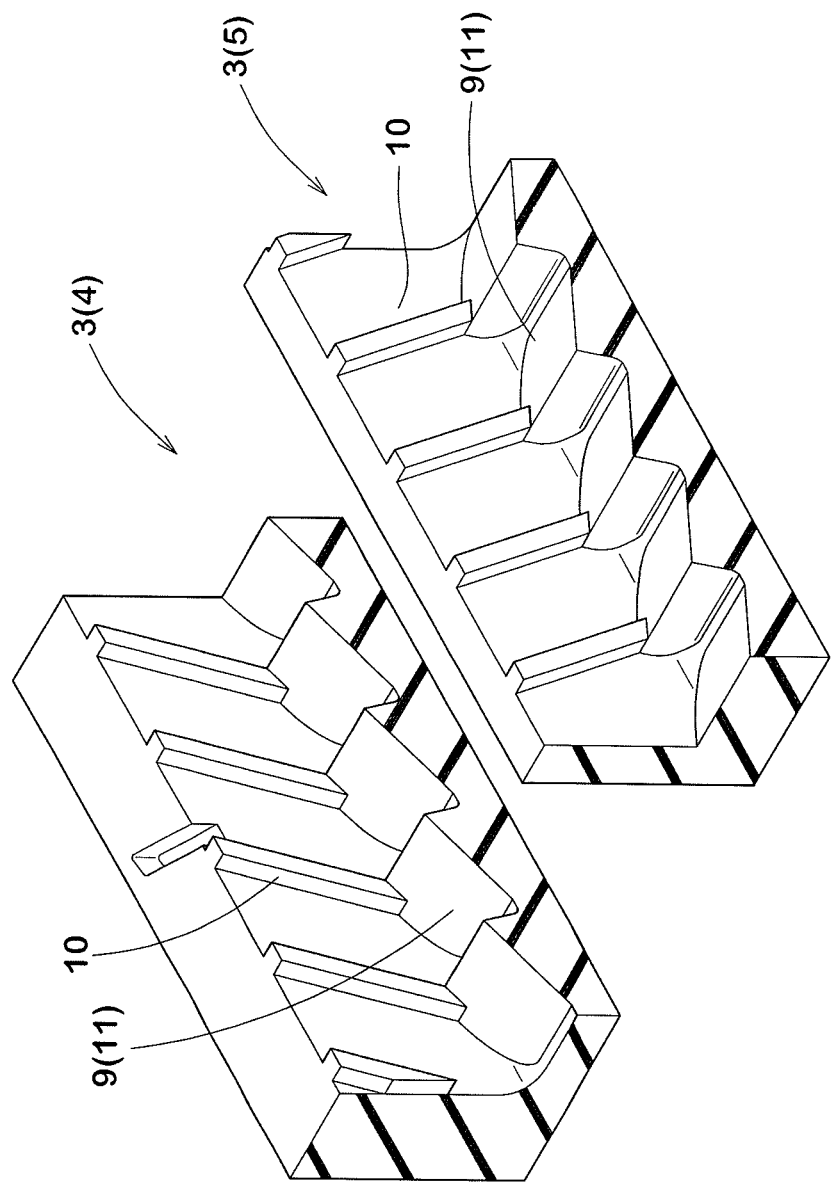

TIRE

TECHNICAL FIELD

The present invention relates to a tyre having a tread portion provided with longitudinal grooves.

BACKGROUND ART

The tread portion of a tyre is usually provided with longitudinal grooves for drainage extending in a tyre circumferential direction. In the tyre configured as such, during running on a dry road surface, air column pipes are formed between the longitudinal grooves and the ground surface, and compressed air passes through the air column pipes, therefore, air column resonance sound is generated. This air column resonance sound deteriorates noise performance.

In order to decrease the air column resonance sound to improve the noise performance, it has been proposed to change a cross-sectional area of each of the longitudinal grooves in the tyre circumferential direction (see Japanese unexamined Patent Application Publication No. 2004-284499).

However, in recent years, there has been a demand for further improvement of the noise performance.

SUMMARY OF THE INVENTION

The present invention was made in view of the above, and a primary object thereof is to provide a tyre capable of improving the noise performance by improving the longitudinal grooves.

In one aspect of the present invention, a tyre comprises a tread portion comprising at least one longitudinal groove extending in a tyre circumferential direction, wherein the longitudinal groove has a groove bottom surface and a pair of groove wall surfaces extending outwardly in a tyre radial direction from the groove bottom surface, the groove bottom surface is provided with a groove bottom protruding portion protruding outwardly in the tyre radial direction, and at least one of the pair of the groove wall surfaces is provided with a groove wall protruding portion protruding toward a side of a groove center of the longitudinal groove.

In another aspect of the invention, it is preferred that the groove wall protruding portion is connected with the groove bottom protruding portion.

In another aspect of the invention, it is preferred that a height in the tyre radial direction of the groove bottom protruding portion is not less than 0.5 mm.

In another aspect of the invention, it is preferred that a plurality of the groove bottom protruding portions is arranged along a longitudinal direction of the longitudinal groove, and a length in the longitudinal direction between the groove bottom protruding portions adjacent to each other is not more than 15 mm.

In another aspect of the invention, it is preferred that the groove wall protruding portion is formed in a rib shape extending in the tyre radial direction.

In another aspect of the invention, it is preferred that a protruding length of the groove wall protruding portion is in a range of from 0.5 to 5 mm.

In another aspect of the invention, it is preferred that the groove wall protruding portion extends to a ground contacting surface of a land region of the tread portion.

In another aspect of the invention, it is preferred that the or each groove bottom protruding portion includes a first inclined surface inclined so that a groove depth decreases toward one side in the tyre circumferential direction and a second inclined surface connected with the first inclined surface and inclined so that the groove depth increases toward the one side in the tyre circumferential direction.

In another aspect of the invention, it is preferred that a length in the tyre circumferential direction of the first inclined surface is larger than a length in the tyre circumferential direction of the second inclined surface.

In another aspect of the invention, it is preferred that the tread portion is bound with an intended tyre rotational direction, and the first inclined surface is inclined so that the groove depth decreases toward a toe-side in the tyre rotational direction.

In another aspect of the invention, it is preferred that the tread portion is bound with an intended tyre rotational direction, and the groove wall protruding portion is inclined toward a toe-side in the tyre rotational direction as it goes radially outwardly.

In another aspect of the invention, it is preferred that in a standard state in which the tyre is mounted on a standard rim, inflated to a standard inner pressure, and loaded with no tyre load, an angle of the groove wall protruding portion with respect to the tyre radial direction is in a range of from 40 to 90 degrees at an inner end thereof in the tyre radial direction.

BRIEF DESCRIPTION OF THE DRAWINGS

FIG. 5 is a perspective cross-sectional view of one of the longitudinal grooves in another embodiment.

DESCRIPTION OF THE PREFERRED EMBODIMENT

An embodiment of the present invention will now be described below in detail in conjunction with accompanying drawings.

Figure 1:
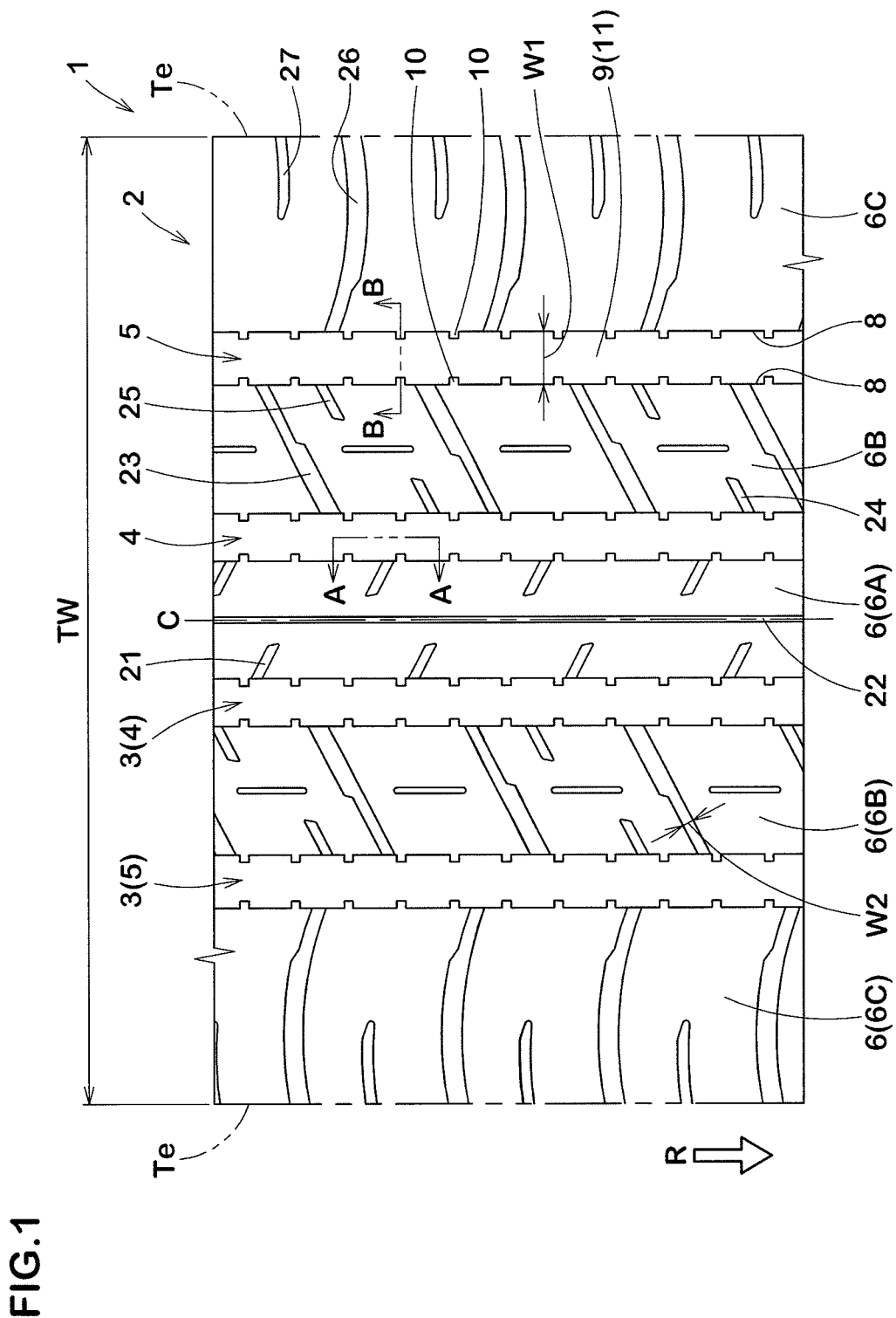
FIG. 1 is a development view of a tread portion of a tyre according to an embodiment of the present invention.

FIG. 1 is a development view of a tread portion 2 of a tyre 1 showing an embodiment of the present invention. In this embodiment, a pneumatic tyre for a passenger car is shown as a preferred example. However, it is needless to say that the present invention is applicable to the tyre 1 of other categories including a tyre for motorcycle or for heavy load, and a non-pneumatic tyre, for example.

The tread portion 2 in this embodiment is bound with an intended tyre rotational direction (R). The tyre rotational direction (R) is indicated by letters and the like on a sidewall portion (not shown), for example. Note that the present invention is not limited to a tyre bound with the intended tyre rotational direction (R).

As shown in FIG. 1, the tread portion 2 is provided with at least one longitudinal groove 3 extending in the tyre circumferential direction. The tread portion 2 in this embodiment is provided with a plurality of the longitudinal grooves 3. The longitudinal grooves 3 in this embodiment extends continuously in the tyre circumferential direction. The longitudinal grooves 3 includes a pair of crown longitudinal grooves 4 each extending continuously in the tyre circumferential direction on a respective side of a tyre equator (C), and a pair of shoulder longitudinal grooves 5 each extending continuously in the tyre circumferential direction on an outer side in a tyre axial direction of a respective one of the crown longitudinal grooves 4.

The tread portion 2 includes land regions 6 divided by the longitudinal grooves 3. The land regions 6 in this embodiment include a crown land region 6A, a pair of middle land regions 6B, and a pair of shoulder land regions 6C. The crown land region 6A is defined between the pair of the crown longitudinal grooves 4. Each of the middle land regions 6B in this embodiment is defined between a respective one of the crown longitudinal grooves 4 and its adjacent one of the shoulder longitudinal grooves 5. Each of the shoulder land regions 6C is defined between a respective one of the shoulder longitudinal grooves 5 and its adjacent one of tread edges (Te). Note that the tread portion 2 of the tyre 1 of the present invention is not limited to such an embodiment.

The "tread edges" (Te) are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In the standard state, a distance in the tyre axial direction between the tread edges (Te) is defined as a tread width TW. Dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tyre is for a passenger car, the standard inner pressure is 180 kPa.

The "standard load" is a tyre load specified for the concerned tyre by a standard included in a standardization system on which the tyre 1 is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. When the tyre is for a passenger car, the standard load is a load equivalent to 88% of the above load.

Figure 2:
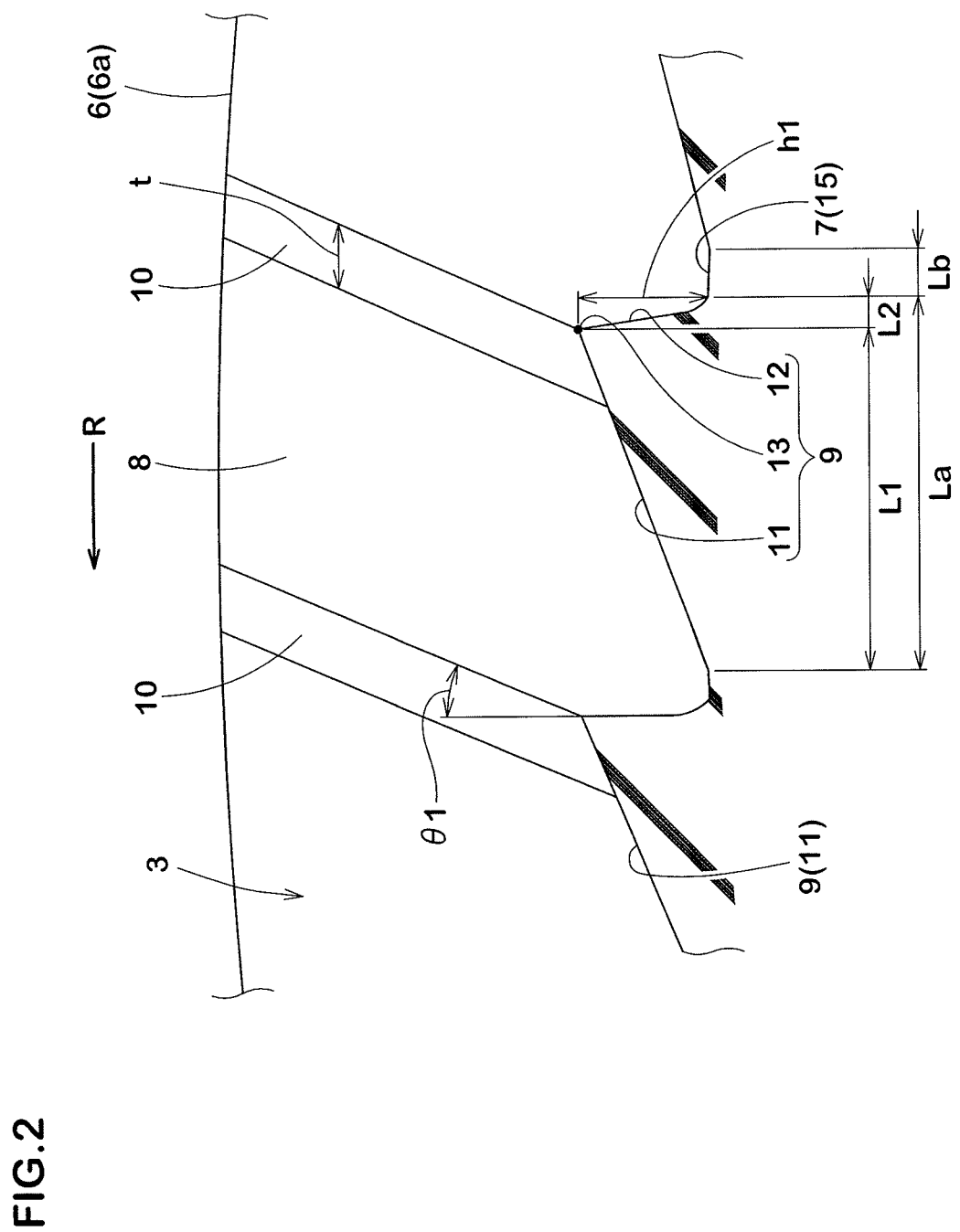
FIG. 2 is a cross-sectional view taken along A-A line of FIG. 1.
Figure 3:
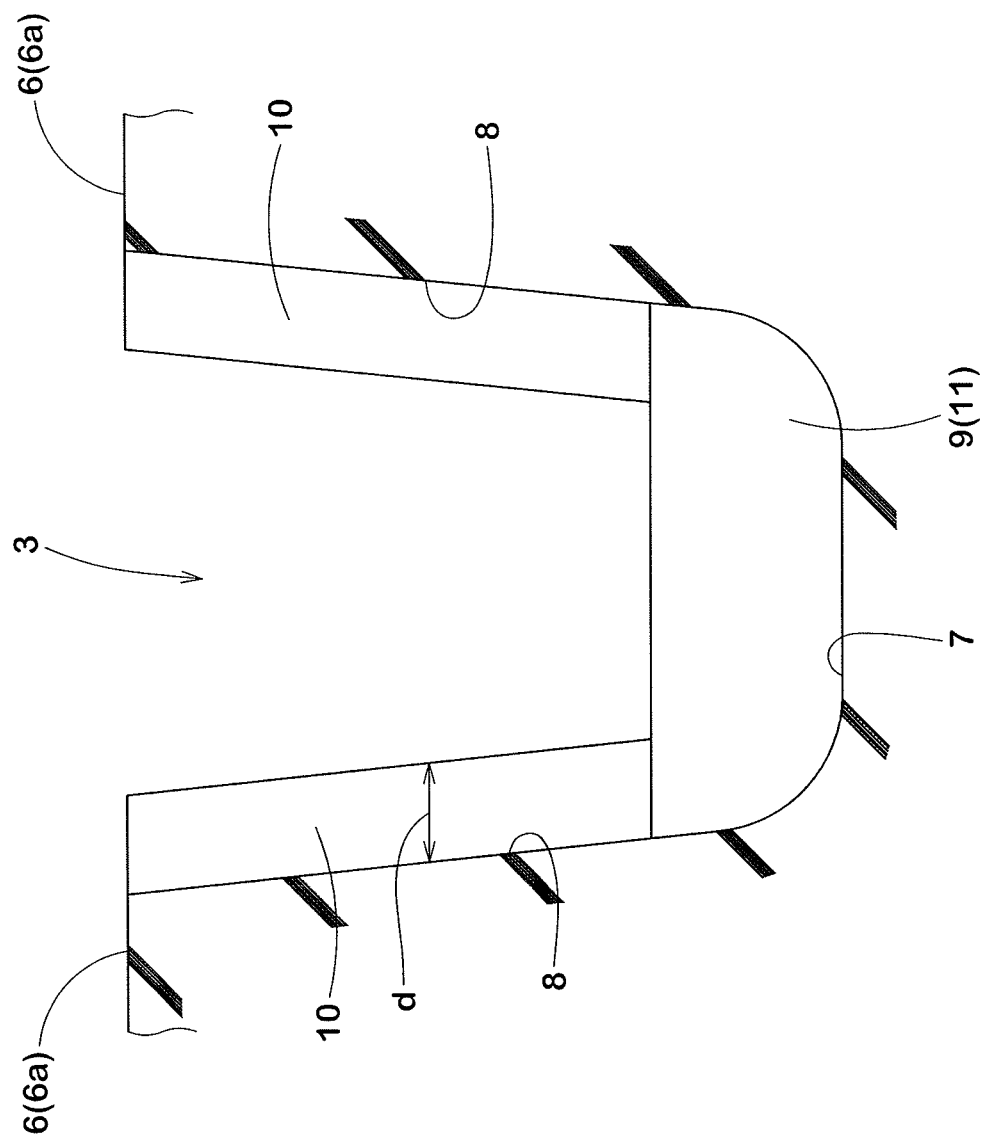
FIG. 3 is a cross-sectional view taken along B-B line of FIG. 1.
Figure 4:
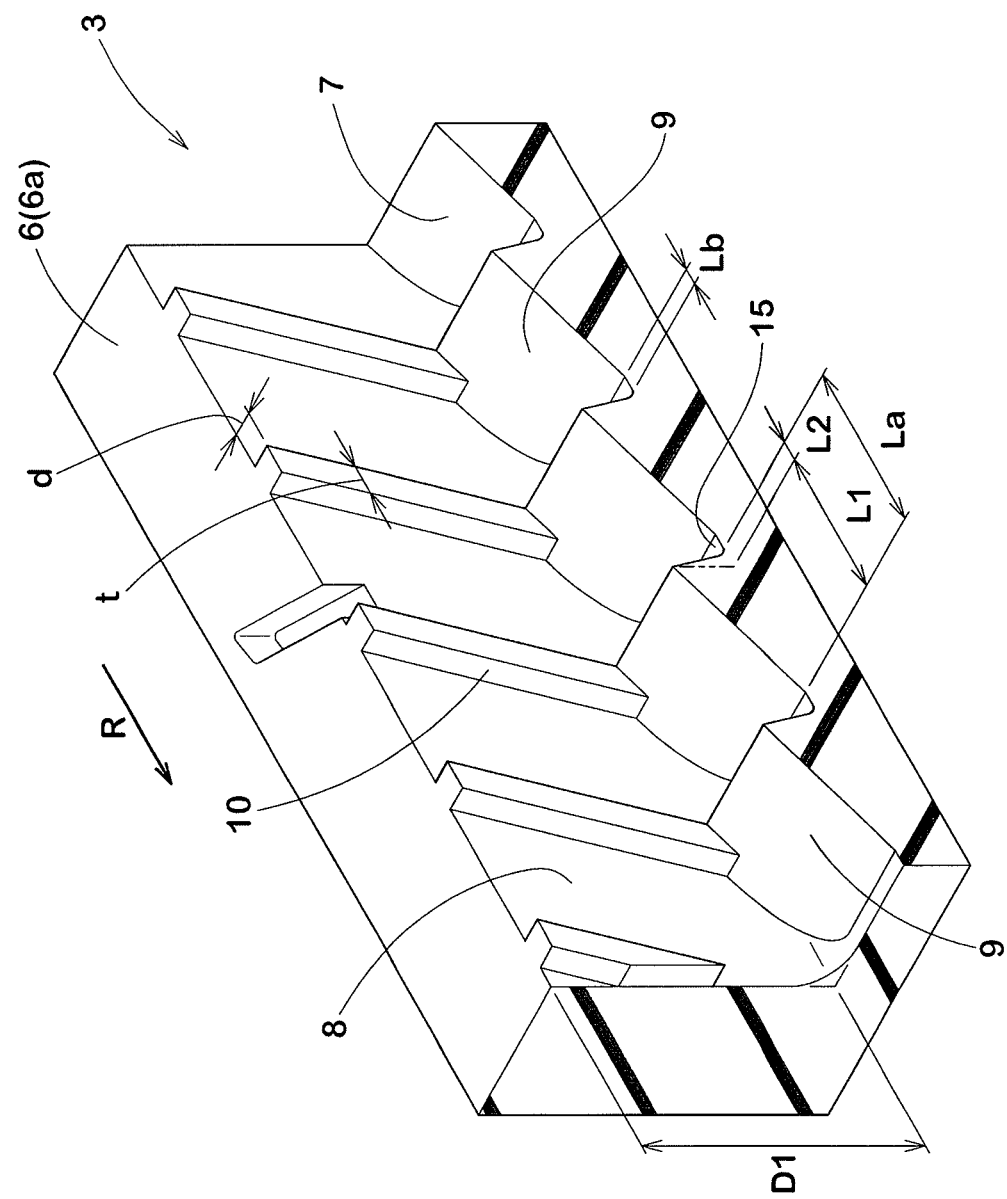
FIG. 4 is a perspective cross-sectional view of one of longitudinal grooves of FIG. 1.

FIG. 2 is a cross-sectional view of one of the longitudinal grooves 3 taken along A-A line of FIG. 1. FIG. 3 is a cross-sectional view taken along B-B line of FIG. 1. FIG. 4 is a perspective cross-sectional view of one of the longitudinal grooves 3. As shown in FIGS. 2 to 4, the each of the longitudinal grooves 3 in this embodiment has a groove bottom surface 7 and a pair of groove wall surfaces 8 extending outwardly in a tyre radial direction from the groove bottom surface 7.

The groove bottom surface 7 in this embodiment is provided with groove bottom protruding portions 9 each protruding outwardly in the tyre radial direction. The groove bottom protruding portions 9 change a groove cross-sectional area of each of the longitudinal grooves 3 in the tyre circumferential direction. Thereby, frequency of the air column resonance sound generated when the tyre contacts the ground as it rotates changes, therefore, the constant frequency is not maintained, thus, the noise performance is improved. Each of the groove wall surfaces 8 in this embodiment is provided with groove wall protruding portions 10 each protruding toward a side of a groove center of a respective one of the longitudinal grooves 3. The groove wall protruding portions 10 disturb a flow of air in each of the longitudinal grooves 3, therefore, the air column resonance sound is decreased. Thereby, in the tyre 1 of the present invention, the noise performance is improved.

Each of the groove bottom protruding portions 9 in this embodiment includes a first inclined surface 11 inclined so that a groove depth decreases toward one side in the tyre circumferential direction and a second inclined surface 12 connected with the first inclined surface 11 and inclined so that the groove depth increases toward the one side in the tyre circumferential direction. The groove bottom protruding portions 9 configured as such effectively change the groove cross-sectional areas of the longitudinal grooves 3, therefore, the noise performance is further improved. Further, the groove bottom protruding portions 9 configured as such ensure a smooth flow of water in the longitudinal grooves 3, therefore, drainage performance is maintained.

Each of the groove bottom protruding portions 9 in this embodiment is formed to have a triangular shape including a top portion 13 convex in the tyre radial direction at a intersection position between the first inclined surface 11 and the second inclined surface 12 in a cross-sectional view taken along a longitudinal direction of a respective one of the longitudinal grooves 3. Each of the groove bottom protruding portions 9 configured as such effectively changes the groove cross-sectional area over the first inclined surface 11 and the second inclined surface 12. Thereby, the noise performance is further improved. Further, it is possible that the groove bottom protruding portions 9 configured as such flow the water more smoothly in the longitudinal grooves 3, therefore, the drainage performance is maintained high. Furthermore, the groove bottom protruding portions 9 each formed in a triangular shape have smaller volume as compared with the groove bottom protruding portions each formed in a rectangular shape (not shown), therefore, heat generation due to hysteresis loss in the groove bottom protruding portions 9 is suppressed.

The "triangular shape" described above is not limited to a triangle formed by the first inclined surface 11 and the second inclined surface 12 configured as straight lines, but also includes an embodiment in which each of the inclined surfaces 11 and 12 is configured as a circular arc having a large radius of curvature as compared with a length thereof and an embodiment in which the top portion 13 is formed by a circular arc having a small radius of curvature, for example.

Each of the first inclined surface 11 and the second inclined surface 12 extends straight and inwardly in the tyre radial direction from the top portion 13 in the cross-sectional view described above. Thereby, the groove cross-sectional area gradually changes over the first inclined surface 11 and the second inclined surface 12, therefore, the noise performance is further improved. Furthermore, resistance of the water flowing in the grooves is maintained small, therefore, the drainage performance is improved. The first inclined surface 11 and the second inclined surface 12 are not limited to such an embodiment, they may be each configured as a smooth circular arc convex outwardly in the tyre radial direction or a smooth circular arc convex inwardly in the tyre radial direction, for example.

The first inclined surface 11 in this embodiment is formed to have a length L1 in the tyre circumferential direction larger than a length L2 in the tyre circumferential direction of the second inclined surface 12. With the second inclined surfaces 12 configured as such, the changes of the groove cross-sectional area in the longitudinal grooves 3 are relatively large, therefore, the noise performance is further improved. Furthermore, each of the first inclined surface 11 has a relatively large surface area, therefore, it effectively contacts with the air flowing in a respective one of the longitudinal grooves 3. Thereby, heat of the groove bottom surface 7 due to the hysteresis loss as the tyre 1 rotates is effectively removed from the first inclined surfaces 11, therefore, heat dissipation performance is improved.

In order to effectively exert the above-described effects, it is preferred that the length L1 of each of the first inclined surfaces 11 is in about the range of from 80% to 95% of a length (La) in the tyre circumferential direction of each of the groove bottom protruding portions 9. Note that it is preferred that the length (La) in the tyre circumferential direction of each of the groove bottom protruding portions 9 is in about the range of from 0.5 to 2 times a groove width W1 of each of the longitudinal grooves 3 having the groove bottom protruding portions 9, for example.

Each of the first inclined surfaces 11 in this embodiment has a groove depth decreasing toward a toe-side in the tyre rotational direction (R). Thereby, the air having passed through the first inclined surfaces 11 is smoothly discharged from the inside of the longitudinal grooves 3 to the outside in the tyre radial direction while effectively removing heat from the groove bottom protruding portions 9. Further, the first inclined surfaces 11 discharge the water in the longitudinal grooves 3 smoothly to the toe-side in the tyre rotational direction (R), therefore, the drainage performance is maintained high. Each of the second inclined surfaces 12 in this embodiment has a groove depth increasing toward the toe-side in the tyre rotational direction (R).

It is preferred that a height (h1) in the tyre radial direction of each of the groove bottom protruding portions 9 is not less than 0.5 mm. The groove bottom protruding portions 9 configured as such ensure the change in the cross-sectional area of each of the longitudinal grooves 3, therefore, the noise performance is improved. If the height (h1) is excessively large, the groove cross-sectional area of each of the longitudinal grooves 3 becomes small, therefore, it is possible that the drainage performance is deteriorated. Thereby, the height (h1) of each of the groove bottom protruding portions 9 is preferably not more than 3.0 mm, more preferably not more than 1.5 mm.

A plurality of the groove bottom protruding portions 9 in this embodiment is provided along the longitudinal direction of each of the longitudinal grooves 3. Thereby, the above-described effects are exerted on the circumference of the tyre, therefore, the noise performance, the heat dissipation performance, and the drainage performance are improved.

It is preferred that a length (Lb) in the longitudinal direction between the groove bottom protruding portions 9 is not more than 15 mm. If the length (Lb) is larger than 15 mm, it is possible that the above-described effects by the groove bottom protruding portions 9 are deteriorated. Thereby, the length (Lb) is more preferably not more than 10 mm, further preferably not more than 5 mm. In this embodiment, a maximum depth portion having the maximum depth is formed with a small length between each pair of the groove bottom protruding portions 9 adjacent to each other. Note that in the tyre 1 in this embodiment, the groove bottom protruding portions 9 may be formed continuously in the longitudinal direction without having the maximum depth portions 15.

The groove wall protruding portions 10 in this embodiment are connected with the groove bottom protruding portions 9. The groove wall protruding portions 10 configured as such effectively disturb the flow of the air in the longitudinal grooves 3 flowing along the groove bottom protruding portions 9, therefore, the air column resonance sound is further decreased. Further, the groove wall protruding portions 10 generate turbulent in the longitudinal grooves 3, therefore, it is possible that the heat dissipation effect is increased.

Each of the groove wall protruding portions 10 in this embodiment is connected with the top portion 13 of a respective one of the groove bottom protruding portions 9. Each of the groove wall protruding portions 10 configured as such is formed to have a small height in the tyre radial direction, therefore, the resistance of water flow in the longitudinal grooves 3 is maintained low, thereby, the drainage performance is improved. Each of the groove wall protruding portions 10 in this embodiment is connected on a respective one of the first inclined surfaces 11 including the top portion 13.

The groove wall protruding portions 10 are each formed in a rib shape extending in the tyre radial direction. The groove wall protruding portions 10 configured as such exert the disturbing effect of the air flow while decreasing the resistance of the water flow in the longitudinal grooves 3, therefore, the noise performance and the drainage performance are improved in a good balance.

Each of the groove wall protruding portions 10 is formed in a rectangular shape in a cross section taken along the longitudinal direction of a respective one of the longitudinal grooves 3. The groove wall protruding portions 10 configured as such effectively disturb the air flow in the longitudinal grooves 3, therefore, the air column resonance sound is decreased.

It is preferred that a protruding length (d) of each of the groove wall protruding portions 10 is in the range of from 0.5 to 5 mm. If the protruding length (d) of each of the groove wall protruding portions 10 is less than 0.5 mm, the disturbing effect of the air flow becomes small, therefore, it is possible that the noise performance is decreased. If the protruding length (d) of each of the groove wall protruding portions 10 is more than 5 mm, drainage resistance becomes large, therefore, it is possible that the drainage performance is deteriorated.

From the similar point of view, it is preferred that a length (t) in the tyre circumferential direction of each of the groove wall protruding portions 10 is in the range of from 0.5 to 5 mm.

The groove wall protruding portion 10 in this embodiment is provided on both of a pair of the groove wall surfaces 8 of a respective one of the longitudinal grooves 3. Thereby, the above-described effects are effectively exerted. Each of the protruding portions 10 in this embodiment provided on one of the pair of the groove wall surfaces 8 is formed at the same position with respect to the tyre circumferential direction as the corresponding one of the protruding portions 10 provided on the other one of the pair of the groove wall surfaces 8.

Each of the groove wall protruding portions 10 in this embodiment extends to a ground contacting surface (6*a*) of a respective one of the land regions 6. The groove wall protruding portions 10 configured as such effectively disturb the air flow in the longitudinal grooves 3, therefore, the noise performance is improved. Further, it is possible that the groove wall protruding portions 10 smoothly guide the air and the water in the longitudinal grooves 3 to the outside in the tyre radial direction. Thereby, the heat dissipation performance and the drainage performance are improved in a good balance. Each of the groove wall protruding portions 10 in this embodiment is formed so as to connect between a respective one of the groove bottom protruding portions 9 and the ground contacting surface (6a).

Each of the groove wall protruding portions 10 in this embodiment is inclined toward the toe-side in the tyre rotational direction (R) as it goes radially outwardly. Thereby, the water and the air flowing along the first inclined surfaces 11 as the tyre 1 rotates are discharged further smoothly to the outside in the tyre radial direction (the outside in the tyre radial direction of the ground contacting surfaces (6a) of the land regions 6).

It is preferred that an angle θ1 of each of the groove wall protruding portions 10 with respect to the tyre radial direction is in the range of from 40 to 90 degrees at an inner end thereof in the tyre radial direction. If the angle θ1 of each of the groove wall protruding portions 10 is less than 40 degrees, the resistance of the water flowing in the longitudinal grooves 3 is increased, therefore, it is possible that the drainage performance is deteriorated. Further, if the angle θ1 of each of the groove wall protruding portions 10 is more than 90 degrees, it is possible that the air and the water in the longitudinal grooves 3 cannot be discharged to the outside in the tyre radial direction. From such a point of view, the angle θ1 of each of the groove wall protruding portions 10 is preferably not more than 80 degrees, more preferably not more than 70 degrees.

Each of the crown longitudinal grooves 4 and the shoulder longitudinal grooves 5 in this embodiment is provided with the groove bottom protruding portions 9 and the groove wall protruding portions 10 configured as such. Thereby, the above-described effects are exerted further effectively.

It is preferred that each of the longitudinal grooves 3 provided with the groove bottom protruding portions 9 and the groove wall protruding portions 10 configured as such has the groove width W1 in about the range of from 5 to 15 mm and a groove depth D1 in about the range of from 6 to 15 mm.

The crown land region 6A in this embodiment is provided with crown lateral grooves 21 each extending from one of the crown longitudinal grooves 4 toward the tyre equator (C) and a longitudinal shallow groove 22 extending continuously in the tyre circumferential direction. Each of the middle land regions 6B in this embodiment is provided with middle lateral grooves 23 each extending in the tyre axial direction so as to connect between one of the crown longitudinal grooves 4 and its adjacent one of the shoulder longitudinal grooves 5, first middle lateral grooves 24 each extending from one of the crown longitudinal grooves 4, and second middle lateral grooves 25 each extending from one of the shoulder longitudinal grooves 5. Each of the shoulder land regions 6C in this embodiment is provided with shoulder lateral grooves 26 each extending in the tyre axial direction so as to connect between one of the shoulder longitudinal grooves 5 and its adjacent one of the tread edges (Te), and shoulder lateral grooves 27 extending axially inwardly from one of the tread edges (Te) and terminating within the shoulder land regions 6C. A groove width W2 of each of the longitudinal shallow groove 22, each of the lateral grooves 21, 24, 25, and 27, and each of the lateral grooves 23 and 26 in this embodiment is not more than 50% of the groove width W1 of each of the longitudinal grooves 3. Each of the longitudinal shallow groove 22, the lateral grooves 21, 24, 25, 27, 23, and 26 configured as such has a small groove volume, therefore, the noise performance is maintained high. Note that the pattern shape of the land regions is not limited to such an embodiment, and may be formed in various embodiments.

FIG. 5 is a perspective cross-sectional view of one of the longitudinal grooves 3 in another embodiment of the present invention. The same reference numerals are given to the elements common to the embodiment described above, and the explanation thereof is omitted here. Each of the crown longitudinal grooves 4 and the shoulder longitudinal grooves 5 in this embodiment is provided with the groove bottom protruding portions 9 and the groove wall protruding portions 10.

In this embodiment, the inclination direction of the first inclined surfaces 11 of the groove bottom protruding portions 9 provided in each of the crown longitudinal grooves 4 is opposite to the inclination direction of the first inclined surfaces 11 of the groove bottom protruding portions 9 provided in each of the shoulder longitudinal grooves 5. That is, each of the first inclined surfaces 11 of the crown longitudinal grooves 4 has the groove depth decreasing toward one side (the right side in the figure) in the tyre circumferential direction, and each of the first inclined surfaces 11 of the shoulder longitudinal grooves 5 has the groove depth decreasing toward the other side (the left side in the figure) in the tyre circumferential direction. Further in this embodiment, the inclination direction of the groove wall protruding portions 10 provided in the crown longitudinal grooves 4 is opposite to the inclination direction of the groove wall protruding portions 10 provided in the shoulder longitudinal grooves 5. That is, the groove wall protruding portions 10 of the crown longitudinal grooves 4 are inclined toward one side in the tyre circumferential direction as it goes radially outwardly, and the groove wall protruding portions 10 of the shoulder longitudinal grooves 5 are inclined toward the other side in the tyre circumferential direction as it goes radially outwardly.

As yet another embodiment of the present invention, in any pair of the longitudinal grooves 3 adjacent to each other in the tyre axial direction, the inclination direction of the first inclined surfaces 11 of the groove bottom protruding portions 9 may be opposite to each other and the inclination direction of the groove wall protruding portions 10 may be opposite to each other. In this embodiment, the first inclined surfaces 11 of one of the shoulder longitudinal grooves 5 on one side in the tyre axial direction and one of the crown longitudinal grooves 4 on the other side in the tyre axial direction are each inclined so that the groove depth thereof increases toward one side in the tyre circumferential direction. The first inclined surfaces 11 of the groove bottom protruding portions 9 of one of the shoulder longitudinal grooves 5 on the other side in the tyre axial direction and one of the crown longitudinal grooves 4 on the one side in the tyre axial direction are each inclined so that the groove depth thereof increases toward the other side in the tyre circumferential direction. Further, the groove wall protruding portions 10 of one of the shoulder longitudinal grooves 5 on the one side in the tyre axial direction and one of the crown longitudinal grooves 4 on the other side in the tyre axial direction are each inclined toward the one side in the tyre circumferential direction as it goes radially outwardly. Conversely, the groove wall protruding portions 10 of one of the shoulder longitudinal grooves 5 on the other side in the tyre axial direction and one of the crown longitudinal grooves 4 on the one side in the tyre axial direction are each inclined toward the other side in the tyre circumferential direction as it goes radially outwardly (not shown).

Figure 6A:
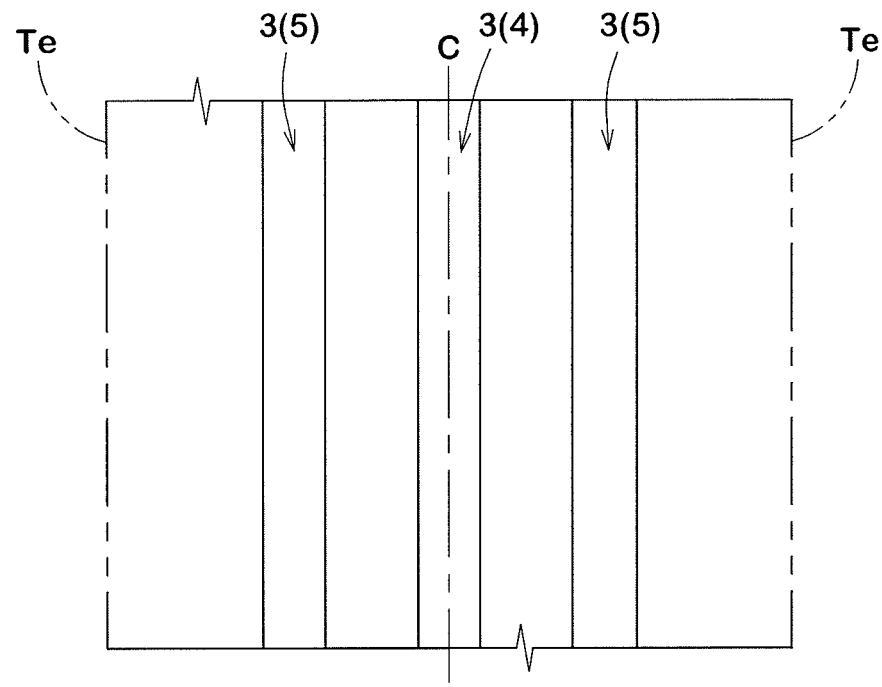
FIG. 6A is a development view of the tread portion in yet another embodiment.

Furthermore, FIG. 6A shows further another embodiment of the present invention. The same reference numerals are given to the elements common to the embodiments described above, and the explanation thereof is omitted here. The tread portion 2 in this embodiment is formed to have the longitudinal grooves 3 composed of one crown longitudinal groove 4 extending continuously in the tyre circumferential direction and a pair of the shoulder longitudinal grooves 5 arranged on both sides of the crown longitudinal groove 4 and each extending continuously in the tyre circumferential direction. Each of the longitudinal grooves 3 is provided with the groove bottom protruding portions 9 and the groove wall protruding portions 10 of this embodiment (not shown).

Figure 6B:
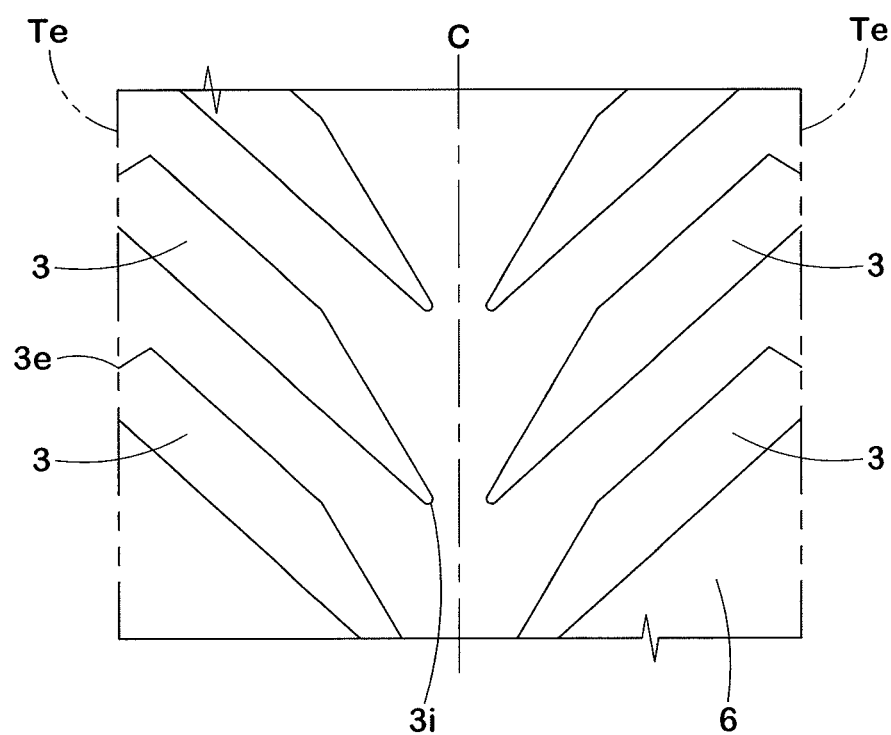
FIG. 6B is a development view of the tread portion in further another embodiment.

Furthermore, FIG. 6B shows further another embodiment. The same reference numerals are given to the elements common to the embodiments described above, and the explanation thereof is omitted here. The tread portion 2 in this embodiment is provided with a plurality of longitudinal grooves 3 arranged at intervals in the tyre circumferential direction on both sides of the tyre equator (C). Each of the longitudinal grooves 3 in this embodiment has one end (3*i*) arranged spaced away from the tyre equator (C) and the other end (3*e*) connected with its adjacent one of the tread edges (Te), and is inclined with respect to the tyre circumferential direction. These longitudinal grooves 3 are provided with the groove bottom protruding portions 9 and the groove wall protruding portions 10 of this embodiment.

While detailed description has been made of the tyre as an embodiment of the present invention, it is needless to say that the present invention can be embodied in various forms without being limited to the illustrated embodiments.

Working Example (Example)

Tyres of size 255/50R20 having the basic pattern shown in FIG. 1 were made by way of test according to the specifications listed in Table 1, and then each of the test tyres was tested for the noise performance, the heat dissipation performance, and the drainage performance.

Common specifications of the test tyres and the test methods were as follows.

Groove depth d1 of Longitudinal groove: 8 mm
Groove width W1 of Longitudinal groove: 11 mm
Length (La) of Groove bottom protruding portion/Groove width W1 of Longitudinal groove (La/W1): 1
<Noise Performance>

Each of the test tyres was mounted on all wheels of an ordinary passenger car, and while the test car was driven on a road noise measuring road (a road having a rough asphalt surface) at a speed of 60 km/h, the in-car noise was sampled at a position in the vicinity of the driver's window-side ear, and the sound pressure level of the air-column resonance sound at a peak occurring around 240 Hz in the narrow band was measured. The results are indicated by an index based on the reciprocal of the sound pressure level of a Conventional example being 100, wherein the larger numerical value is better.

Tyre inner pressure: 200 kPa
<Heat Dissipation Performance>

A maximum temperature of the tread portion was measured while the above test car was driven on a dry asphalt road surface of a circuit test course. The results are indicated by an index based on the reciprocal of the maximum temperature of the conventional example being 100, wherein the larger the numerical value, the lower the maximum temperature is, which shows better heat dissipation performance.

Driving speed: 80 km/h
Driving time: 30 minutes
<Drainage Performance>

By using an inside drum testing machine, while the test tyres were run on the drum surface covered by 5.0 mm depth of water under the following conditions, the speed when the hydroplaning phenomenon occurred was measured.

The results are indicated by an index based on the conventional example being 100, wherein the larger the numerical value, the higher the speed when the hydroplaning phenomenon occurred is, which shows better drainage performance.

Slip angle: 1.0 degree
Vertical load: 4.2 kN
The test results and the like are shown in Table 1.

TABLE 1

| | | Conventional Example | Example | Reference |
|---|---|---|---|---|
| Height (h1) of Groove bottom protruding portion | [mm] | — | 1.5 | 1.5 |
| Length (La) of Groove bottom protruding portion | [mm] | — | 11 | 11 |
| Length (Lb) of Groove bottom protruding portion | [mm] | — | 0.1 | 0.1 |
| Ratio (L1/La) of Length (L1) of First inclined surface and Length (La) of Groove bottom protruding portion | [%] | — | 90 | 50 |
| Angle (θ1) of Groove wall protruding portion | [degree] | — | 40 | — |
| Protruding length (d) of Groove wall protruding portion | [mm] | — | 2.0 | — |
| Noise performance | [index: larger is better] | 100 | 130 | 103 |
| Heat dissipation performance | [index: larger is better] | 100 | 130 | 105 |
| Drainage performance | [index: larger is better] | 100 | 130 | 100 |

From the test results, it was confirmed that the noise performance was improved for the tyres as Example as compared with the tyres as Reference. Further, it was confirmed that the heat dissipation performance and the drainage performance were improved as well for the tyres as the Example as compared with the tyres as the Reference.

The invention claimed is:

1. A tire comprising:
a tread portion comprising at least one longitudinal groove extending in a tire circumferential direction, wherein
the longitudinal groove has a groove bottom surface and a pair of groove wall surfaces extending outwardly in a tire radial direction from the groove bottom surface,
the groove bottom surface is provided with at least one groove bottom protruding portion protruding outwardly in the tire radial direction,
at least one groove wall surface of the pair of groove wall surfaces is provided with at least one groove wall protruding portion protruding toward a side of a groove center of the longitudinal groove, the at least one groove wall protruding portion includes a plurality of groove wall protruding portions arranged in a longitudinal direction of the longitudinal groove, the at least one groove bottom protruding portion includes a plurality of groove bottom protruding portions arranged in the longitudinal direction of the longitudinal groove, pitches of the groove wall protruding portions are the same as pitches of the groove bottom protruding portions, each of the groove bottom protruding portions includes a first inclined surface inclined so that a groove depth decreases toward one side in the tire circumferential direction and a second inclined surface connected with the first inclined surface and inclined so that the groove depth increases toward the one side in the tire circumferential direction, the tread portion is bound with an intended tire rotational direction, the first inclined surface is inclined so that the groove depth decreases toward a toe-side in the tire rotational direction, the groove wall protruding portions are each inclined toward a toe-side in the tire rotational direction as each of the groove wall protruding portions goes radially outwardly, and each of the groove wall protruding portions are directly connected with a radially outermost edge of the first inclined surface.

2. The tire according to claim 1, wherein
a height in the tire radial direction of each of the groove bottom protruding portions is not less than 0.5 mm.

3. The tire according to claim 1, wherein
a length in the longitudinal direction between the groove bottom protruding portions adjacent to each other is not more than 15 mm.

4. The tire according to claim 1, wherein
the groove wall protruding portions are each formed in a rib shape extending in the tire radial direction.

5. The tire according to claim 1, wherein
a protruding length of each of the groove wall protruding portions is in a range of from 0.5 to 5 mm.

6. The tire tyre according to claim 1, wherein
the groove wall protruding portions extend to a ground contacting surface of a land region of the tread portion.

7. The tire according to claim 1, wherein
in a standard state in which the tire is mounted on a standard rim, inflated to a standard inner pressure, and loaded with no tire load, an angle of each of the groove wall protruding portions with respect to the tire radial direction is in a range of from 40 to 90 degrees at an inner end thereof in the tire radial direction.

8. The tire according to claim 1, wherein
the groove wall protruding portions are disposed overlapping with the groove bottom protruding portions so that an imaginary line in the tire radial direction passes through both one of the groove wall protruding portions and an edge of a top portion of one of the groove bottom protruding portions, and wherein
the edge of the top portion extends in an axial direction of the tire.

9. The tire according to claim 1, where
a length in the tire circumferential direction of each of the groove bottom protruding portions is in a range of from 0.5 to 2 times a groove width of the longitudinal groove.

10. The tire according to claim 1, wherein
an inclination direction of the first inclined surface of the at least one groove bottom protruding portion of a first longitudinal groove is opposite to an inclination direction of the first inclined surface of the at least one groove bottom protruding portion of a second longitudinal groove with respect to the tire radial direction, and an inclination direction of the at least one groove wall protruding portion of the first longitudinal groove is opposite to an inclination direction of the at least one groove wall protruding portion of the second longitudinal groove with respect to the tire radial direction.

11. The tire according to claim 10, wherein
the first longitudinal groove and the second longitudinal groove are a crown longitudinal groove and a shoulder longitudinal groove, the crown longitudinal groove is arranged adjacent to a tire equator in the tire axial direction, and the shoulder longitudinal groove is arranged axially outside the crown longitudinal groove.

12. The tire according to claim 1, wherein
a length in the tire circumferential direction of the first inclined surface is larger than a length in the tire circumferential direction of the second inclined surface.

13. The tire according to claim 12, wherein
the length of the first inclined surface is in a range of from 80% to 95% of a length in the tire circumferential direction of each of the at least one groove bottom protruding portion.

14. The tire according to claim 13, wherein
a length in a longitudinal direction between groove bottom protruding portions among the at least one groove bottom protruding portion that are adjacent to each other is not more than 15 mm.

15. The tire according to claim 13, wherein
a length in a longitudinal direction between groove bottom protruding portions among the at least one groove bottom protruding portion that are adjacent to each other is smaller than the length in the tire circumferential direction of the first inclined surface and larger than the length in the tire circumferential direction of the second inclined surface.

* * * * *